(No Model.)

E. STARKWETHER.
COMBINED LAWN RAKE, SCRAPER, AND CUTTER.

No. 599,368. Patented Feb. 22, 1898.

WITNESSES: INVENTOR
Edward Starkwether
BY
ATTORNEY

UNITED STATES PATENT OFFICE.

EDWARD STARKWETHER, OF SAGINAW, MICHIGAN.

COMBINED LAWN-RAKE, SCRAPER, AND CUTTER.

SPECIFICATION forming part of Letters Patent No. 599,368, dated February 22, 1898.

Application filed July 31, 1897. Serial No. 646,601. (No model.)

*To all whom it may concern:*

Be it known that I, EDWARD STARKWETHER, a citizen of the United States, residing at Saginaw, in the county of Saginaw and State of Michigan, have invented a certain new and useful Combined Lawn-Rake, Scraper, and Cutter; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to and is a lawn-rake, a scraper, a hoe, a weed-cutter, and a window-cleaner combined; and it consists in the special construction shown and described.

Figure 1:
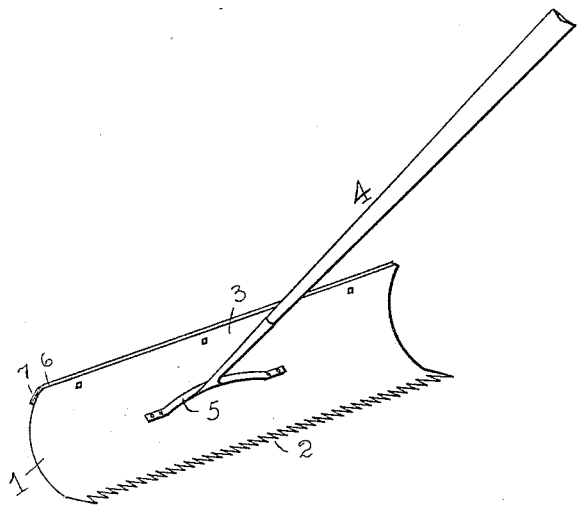
Figure 2:
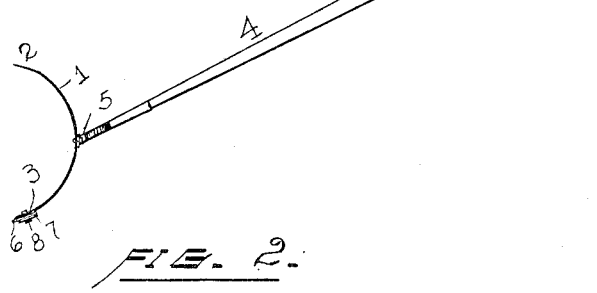
Figure 3:
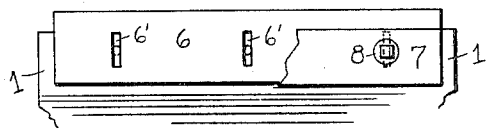

Figure 1 is an elevation of the rake. Fig. 2 is an elevation showing the handle upon the opposite side of the rake for use as a scraper. Fig. 3 is a detail of the window-cleaner attachment.

In the drawings, 1 is the body of the rake, and consists of a piece of sheet metal bent in the proper form, as shown, and having along one edge thereof the cutting-teeth 2. These teeth have their edges sharp for the purpose of cutting the tall grass or weeds that may be drawn between them.

It will be observed that the edge of the body 1, provided with teeth 2, is bent more than the balance of the plate—viz., that it is flatter at this point, so that the teeth may enter the grass at the proper angle. The other edge 3 of the body 1 is straight and sharp for use as a scraper for scraping ice or snow or other substance.

4 is the handle, secured to the body of the rake by bolts passing through the ends of the arms 5 5 of the handle. This handle is adapted to be secured to either side of the plate, as shown. When secured upon the side shown in Fig. 2, the device is used as a scraper for snow or other substance by pushing the device from the person instead of drawing it toward him, as in Fig. 1. Any other means of securing the handle to the rake may be employed without departing from the principle of my invention.

In Fig. 3 I have illustrated in detail a cleaning attachment, which consists of a strip of rubber 6, placed along the edge 3 of the piece 1 with a bar 7 over it, the whole secured by bolts 8 to the plate 1.

6' are transverse slots in the rubber 6, through which the bolts 8 pass, and which permit the rubber to be moved out or in between the bar 7 and the plate 1, so that when it is not desired to use the rubber for cleaning it may be pushed back out of the way by loosening the bolts 8 and tightening them again when the rubber is placed as desired.

I do not wish to confine myself to the special form of the plate 1, as for certain purposes it may be advisable to bend it in somewhat different shape. Any change may therefore be made in the construction of the device suggested by mechanical skill without departing from the principle of my invention.

It will be seen that by turning the device upon its end it can be used as a hoe, one or both of its ends being sharpened for use as a hoe.

The teeth 2 I sharpen usually at and near the base, so that they will cut only what is drawn between them and pass over the short grass.

It will thus be seen that this device possesses great novelty, being adapted for use for a number of purposes—such as raking lawn, cutting weeds on lawn, snow-scraping, cleaning, and hoeing.

Having thus described my invention, what I claim as new, and desire to secure by Letters Patent, is—

A combined lawn-rake, scraper and cutter, comprising a rectangular plate of metal bent, longitudinally, concave, and having short sharp saw-teeth along one edge, the teeth being bent inward at their base to the proper degree to give them the desired slant, the opposite edge straight and sharp and provided with a strip of rubber adjustably secured along the edge for the purpose described, the end edges of the plate being sharp for use as a hoe, and a handle adapted to be secured as specified, and as and for the purpose set forth.

In testimony whereof I hereunto affix my signature in the presence of two witnesses.

EDWARD STARKWETHER.

Witnesses:
JOHN KELLY,
A. H. SWARTHOUT.